(12) United States Patent
Messer

(10) Patent No.: US 6,761,227 B1
(45) Date of Patent: Jul. 13, 2004

(54) DRILL BIT FOR AERATING SOIL FOR A PLANT WITH ROOT SYSTEM

(75) Inventor: Tom William Messer, 19538 Tamarack Way, Houston, TX (US) 77094

(73) Assignee: Tom William Messer, Houston, TX (US)

( * ) Notice: Subject to any disclaimer, the term of this patent is extended or adjusted under 35 U.S.C. 154(b) by 0 days.

(21) Appl. No.: 10/236,741

(22) Filed: Sep. 9, 2002

(51) Int. Cl.[7] .............................................. A01B 45/02
(52) U.S. Cl. ........................... 172/21; 172/41; 408/714
(58) Field of Search .............................. 172/35, 41, 25, 172/378, 21; 408/144, 170, 714

(56) References Cited

U.S. PATENT DOCUMENTS

| | | | | | |
|---|---|---|---|---|---|
| 2,493,261 | A | * | 1/1950 | Porter et al. .................. | 173/40 |
| 2,779,259 | A | * | 1/1957 | Kelsey ........................ | 172/41 |
| 3,842,942 | A | * | 10/1974 | Jensen et al. ............... | 181/207 |
| 3,984,192 | A | * | 10/1976 | Wanner et al. .............. | 408/226 |
| 4,511,004 | A | * | 4/1985 | Deneen ....................... | 172/21 |
| 4,595,322 | A | * | 6/1986 | Clement ..................... | 408/230 |
| 5,466,100 | A | * | 11/1995 | Ahluwalia .................. | 408/224 |
| 5,494,382 | A | * | 2/1996 | Kloppers .................... | 408/226 |
| 6,174,111 | B1 | * | 1/2001 | Anjanappa et al. ......... | 408/1 R |
| 6,227,188 | B1 | * | 5/2001 | Tankala et al. .......... | 125/13.01 |
| 6,352,122 | B1 | * | 3/2002 | Love .......................... | 172/371 |
| 6,428,250 | B2 | * | 8/2002 | Giebmanns ................. | 408/214 |
| 6,588,994 | B2 | * | 7/2003 | Wienhold ................... | 408/226 |

* cited by examiner

Primary Examiner—Victor Batson
(74) Attorney, Agent, or Firm—Wendy Buskop; Buskop Law Group, P.C.

(57) ABSTRACT

The invention is an apparatus for aerating soil proximate to a plant with root system using a hand drill system, made of a polymer drill bit having a shaft with a vertical axis that is generally cylndrically shaped having a connector end and a drill end, an indentation in the drill bit between one-fourth and one-third of the overall length of the polymer drill bit from the drill end, and a drill with a connector to engage the polymer drill bit for forming a bore hole in soil adjacent a plant with root system.

11 Claims, 3 Drawing Sheets

DRILL BIT FOR AERATING SOIL FOR A PLANT WITH ROOT SYSTEM

FIELD OF THE INVENTION

The invention is an apparatus for more easily and effectively aerating and fertilizing soil.

BACKGROUND OF THE INVENTION

A common technique for aerating and fertilizing trees and other plants in the agricultural industry today is to dig a hole in the ground and then to add fertilizer into the hole. Drilling and fertilizing machines such as that disclosed can save a great deal of labor and time, particularly in large agricultural operations, however, for an individual or homeowner this option would be too costly and impractical.

The problem encountered by the homeowner has been the lack of a self-contained power unit that is rechargeable and would allow homeowners the ability to more effectively and efficiently fertilize their trees and shrubs.

Another problem which plagues current machines available in the market are the tendency of certain parts in their system to become rusted or otherwise corroded during prolonged periods of use. This results in the need for frequent lubrication, or for replacement of those parts periodically.

Additionally, due to the presences of unmarked utility lines, sprinkler lines, and large tree roots, a non-metallic and flexible drill bit needed to be developed, thereby flexing or bending when coming in contact with a buried, underground object as mentioned previously.

Finally, a problem with larger pervious devices is that they are difficult to laterally stabilize during drilling. This can result in holes being drilled, which are larger than necessary and can create forces and jerks, which can be transmitted to the operator through the machine.

It is clear that there has existed a long and unfilled need in the prior art for a soil aerating and fertilizing tool which is self contained and rechargeable, resistant to rust and corrosion, non-metallic and flexible, and which provides lateral guidance during drilling thereby reducing unnecessary forces and jerks.

These also exists a need for a powered hand tool specifically created for the purpose of aerating the drip line area beneath trees as well as serving as paths for fertilizer and other nutrients to reach the feeder roots with greater ease.

The development of a powered unit with a motor (electric or gasoline) would greatly improve the efficiency of the effort. Corded or rechargeable units would allow homeowners the ability to fertilize more effectively and efficiently their trees and shrubs. More powerful gasoline powered units would do the same for commercial application. Motors could be built to match the size of the application or intended use. A need also exists for safer drill bits for home use.

The current invention is designed to fill the above-mentioned needs.

SUMMARY OF THE INVENTION

The invention is an apparatus for aerating soil proximate to a plant with root system. The apparatus is made from a polymer drill bit with an indentation between one-fourth and one-third of the overall length of the polymer drill bit from the drill end and a drill that engages the polymer drill bit to form a bore hole in soil adjacent a plant with root system.

The invention also relates generally to a device for drilling, wherein a drill bit mounted on a drill rod assembly forms a drill hole in the soil, in the drip line area, allowing air to mix with the soil and serving as a path for fertilizer and other nutrients, providing a richer, healthier medium that promotes growth in plants and trees.

BRIEF DESCRIPTION OF THE DRAWINGS

The present invention will be explained in greater detail with reference to the appended figures, in which.

DETAILED DESCRIPTION OF THE PREFERRED EMBODIMENTS

Before explaining the present invention in detail, it is to be understood that the invention is not limited to the particular embodiments and that it can be practiced or carried out in various ways.

Figure 1:
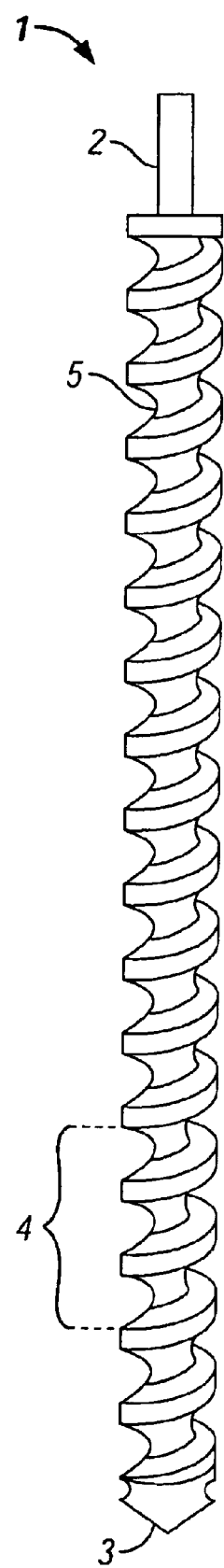
FIG. 1 is a side view of a drill bit according to the invention.

FIG. 1 is a side view of a drill bit (1) according to the invention. The drill bit (1) has a connector end (2) on one end and a drill end (3) on the other. The drill bit (1) has an indentation (4) located on the shaft (5) proximate to the drilling end and penetrates between 2% and 40% of the diameter of the shaft.

Figure 2:
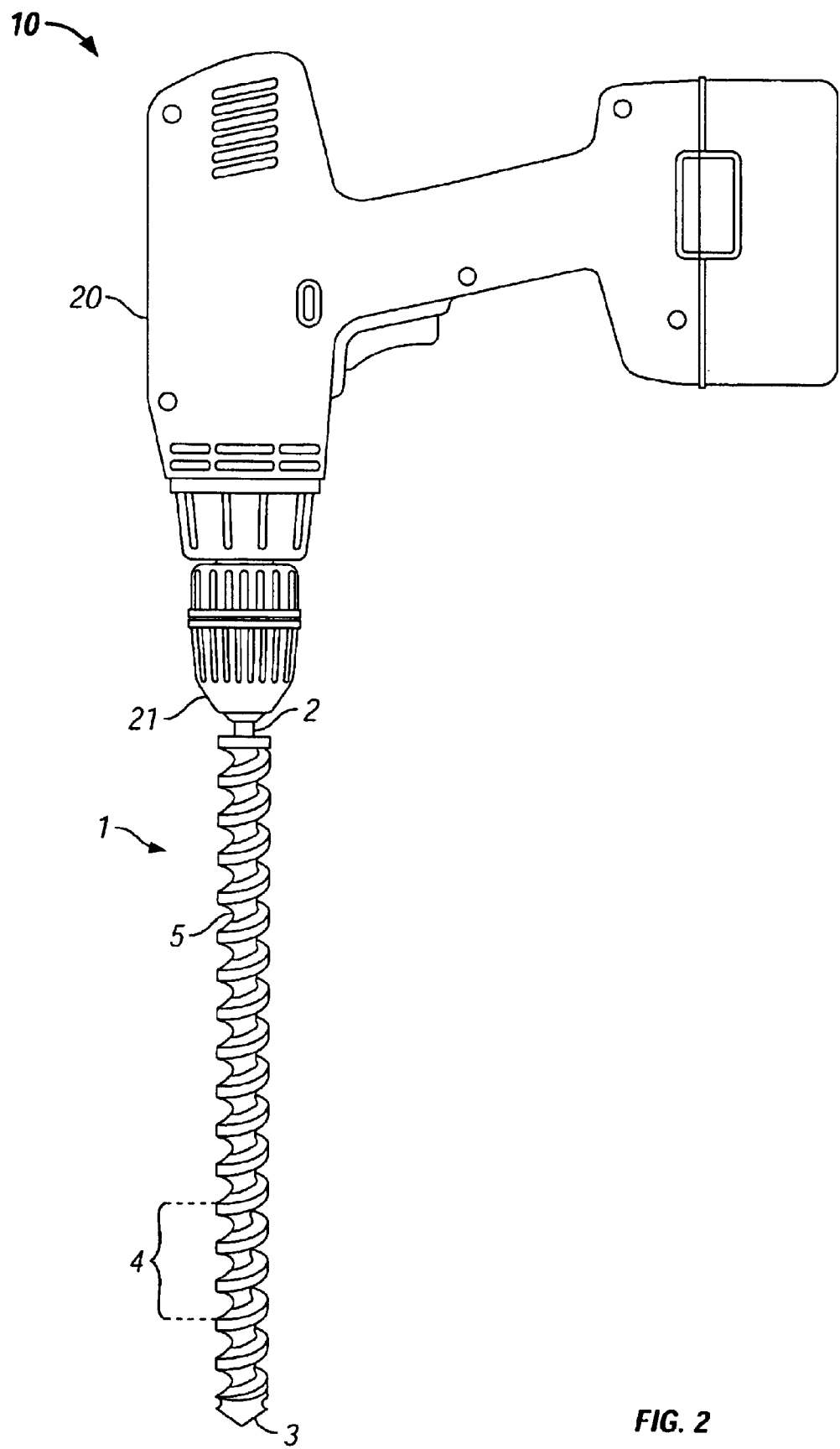
FIG. 2 is a schematic illustration of a drill bit attached to a drill.

FIG. 2 is a schematic illustration of a drill bit (1) attached to a drill (20). FIG. 2 shows the entire drilling apparatus (10) with the drill bit (1) and the drill (20) connected, The drill bit (1) and the drill (20) connect where the drill bit's connector end (2) engages the drill's connection (21). FIG. 2 also shows the aspects of the drill bit (1) shown in FIG. 1 in relation to the drill (20) itself FIG. 2 shows the drill bit's shalt (5), indention (3) and drill end (3).

The invention is an apparatus for aerating soil proximate to a plant with root system using a hand drill system. The apparatus is made of a polymer drill bit having a shaft with a vertical axis that is generally cylindrically shaped having a connector end and a drill end. The drill bit has an indentation between one-fourth and one-third of the overall length of the polymer drill bit from the drill end. In addition, the apparatus includes a drill with a connector to engage the polymer drill bit for forming a bore hole in soil adjacent a plant with root system.

The polymer drill bit in the invention can be made of a non-ferrous material or a non-electrical conducting material. The polymer drill bit can also be tumescent and flexible. "Tumescent and flexible" are terms to describe the drill bit as being capable of absorbing shocks. The polymer drill bit of the apparatus can also be made of a polyamide, a polycarbonate or combinations thereof.

The polymer drill bit of the apparatus can be between 4 and 12 inches long or between 4 and 8 inches long. In the preferred embodiment, the polymer drill bit of the apparatus is 6 inches long. The polymer drill bit can be flexible from the vertical axis between one-half inch and one inch. Further, the polymer drill bit can have a diameter between five-eighths and three-fourths inches. The outer diameter of the polymer drill bit's shaft can be five-eighths inch long.

The drill from the apparatus can be a hand drill or a power drill.

The indentation of the polymer drill bit of the apparatus can penetrate between two and forty percent of the diameter of the shaft.

The invention is also a drill bit for a drill for aerating soil proximate to a plant with root system. The drill bit has a polymer shaft with a vertical axis that is generally cylindrically shaped having a connector end and a drill end, wherein the diameter of the polymer shaft is between one-half inch and one inch. The drill bit also has an indentation located proximate to the drilling end and penetrates between 2% and 40% of the diameter of the shaft.

The drill bit's polymer drill shaft can be non-ferrous material or a non-electrical conducting material. The drill bit's polymer drill shaft can also be tumescent and flexible or "shock absorbing". Materials for the drill bit's polymer drill shaft include polyamides, polycarbonates, or combinations thereof.

The length of the drill bit's polymer drill shaft can be between 4 and 12 inches long or between 4 and 8 inches long. The preferred length of the drill bit's polymer drill shaft is 6 inches long. The diameter of the drill bit's polymer drill shaft can be between one-half inch and one inch. The preferred diameter of the drill bit's polymer drill shaft is five-eighths inches The drill bit's polymer drill shaft drill bit can be flexible from the vertical axis between one-half inch and one inch. The drill bit's indentation penetrates between two and forty percent of the diameter of the shaft.

The invention is also a method for aerating a plant with a root system comprising:

a. drilling a hole in the soil using a drill having a polymer bit, a connector end and a drill end, wherein the bit comprises an indentation between one-fourth and one-third of the overall length of the polymer drill bit from the drill end; and b. forming a plurality of bore holes in soil adjacent to a plant with root system, wherein the plurality of bore holes are located around the drip line of the plant with a root system and are a depth between one inch and the length of the polymer bit.

The drill used in the method can be a hand drill or a power drill. The drill bit used in the method can be made of a polymer.

Figure 3:
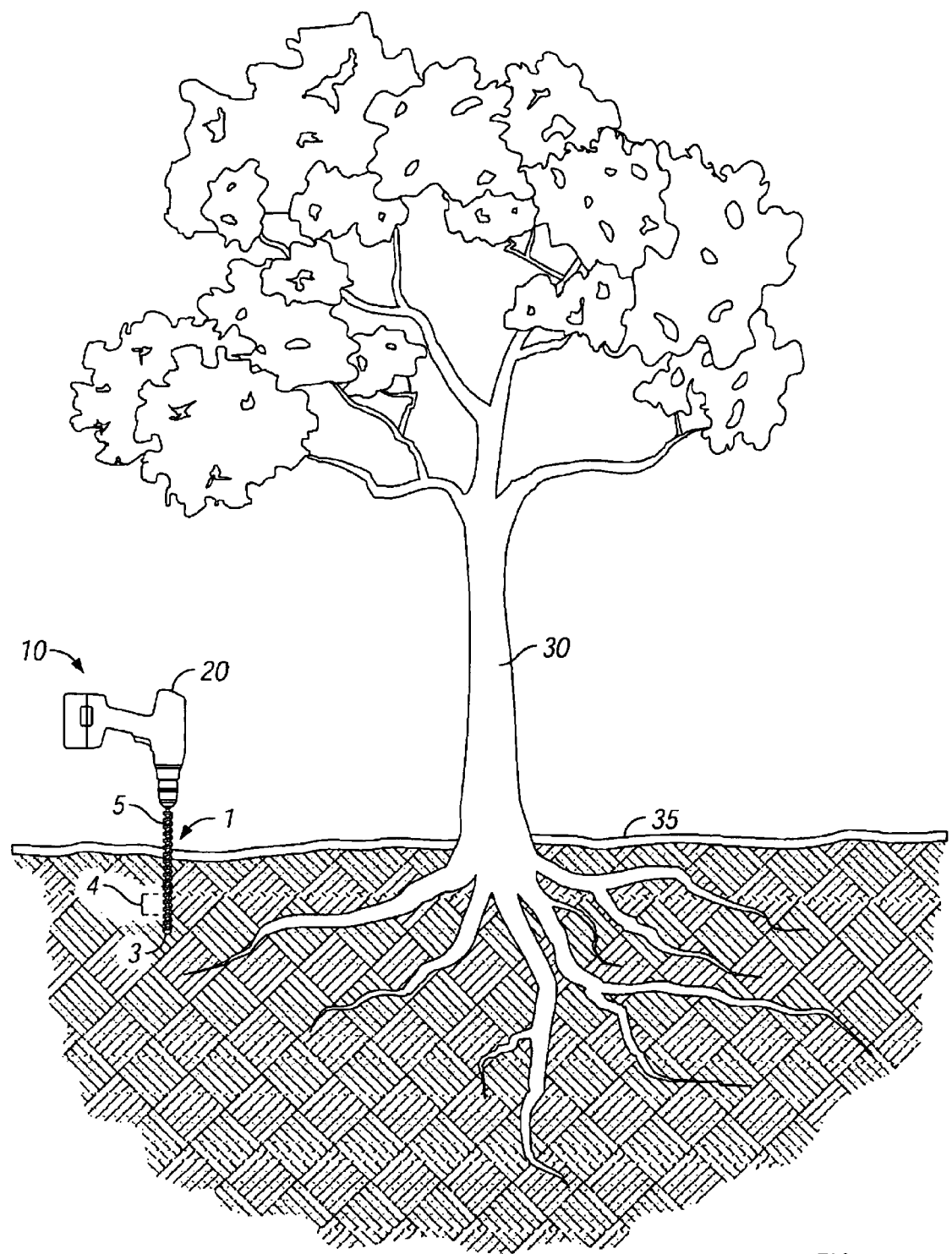
FIG. 3 is a schematic illustration of the device according to the invention aerating the soil under a tree.

FIG. 3 is a schematic illustration of the device according to the invention aerating the soil under a tree. FIG. 3 shows a representation of a plant with a root system (30), herein a tree. The drilling apparatus (10) with the drill (20) and drill bit (1) bores holes into the soil (35) surrounding the tree (30). As shown in FIG. 3, the drill end (3) bores deeply into the soil (35) past the drill bit's indention (4). FIG. 3 is a representation of the invention's method for aerating a plant with a root system (30).

Due to the presence of unmarked utility lines, sprinkler lines, and large tree roots, a non-metallic drill bit is used. Other possible materials include nylon, plastic, or any other of a number of synthetic materials. The drill bits can also be flexible and tumescent, thereby flexing or bending when coming into contact with a buried, underground object. When operated at higher than normal carpentry drill speeds and encountering nothing, but dirt, the non-metallic drill bits function without any problems. Many size selections of drill bits are also possible.

The invention also contemplates several designs. The drill bits can range from one-half to one-inch diameter and between five to twelve inches in length. It should be noted that feeder roots are rarely more than twelve inches beneath the surface. The drill bits can be constructed to be flexible with indentations that allow for several properly spaced flex-points. Slimmer drill bits can be made in the conventional shape using non-metallic materials.

The invention also contemplates a unique connector design with the drill bits so the drill bits can be attached to soil drilling motors. A threaded connection is possible. The threads on the drill bit would run counter to the turning direction of the power unit. Another possible design is that the connection can be a square or a triangle. Any of these designs are possible as long as they allow the drill bit to be used with soil drilling units.

The invention also considers numerous handle designs for the drills including shovel handles, straight handles, and cross-handle designs. A handle with a mid-grip could also be used much like handles on grass trimmers and edgers.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

What is claimed is:

1. A soil aerating drill bit for use in an apparatus for aerating soil proximate to a plant with root system, comprising:

a. a flexible polymer drill bit having a shaft with a vertical axis that is generally cylindrically shaped having a connector end and a drill end;

b. an indentation in the flexible drill bit between one-fourth and one-third of the overall length of the polymer drill bit from the drill, wherein the indentions penetrates between 2 and 40% of the diameter shaft; and c. a drill with a connection to engage the flexible polymer drill bit for forming a bore hole in soil adjacent the plant with root system.

2. The apparatus of claim 1, wherein the polymer drill bit is non-ferrous material.

3. The apparatus of claim 1, wherein the polymer drill bit is turnescent and flexible.

4. The apparatus of claim 1, wherein the polymer drill bit is non-electrical conducting material.

5. The apparatus of claim 4, wherein the polymer drill bit comprises a material selected from the group a polyamide, a polycarbonate and combinations thereof.

6. The apparatus of claim 1, wherein the polymer drill bit is between 4 and 12 inches long.

7. The apparatus of claim 1, wherein the polymer drill bit is between 4 and 8 inches long.

8. The apparatus of claim 1, wherein the polymer drill bit is 6 inches long.

9. The apparatus of claim 1, wherein the diameter of the polymer drill bit is between one-half inch and one inch.

10. The apparatus of claim 1, wherein the outer diameter of the shaft is five-eighths inch long.

11. The apparatus of claim 1, wherein the drill is selected from the group hand drill and power drill.

* * * * *

UNITED STATES PATENT AND TRADEMARK OFFICE
CERTIFICATE OF CORRECTION

PATENT NO.     : 6,761,227 B1
DATED          : July 13, 2004
INVENTOR(S)    : Tom William Messer It is certified that error appears in the above-identified patent and that said Letters Patent is hereby corrected as shown below:

Column 1,
Line 45, delete "These", and insert -- There --.

Column 2,
Line 32, after "connected", delete ",", and insert -- . --.
Line 36, delete "shalt", and insert -- shaft --.

Column 3,
Line 21, after "inches" insert -- . --.

Column 4,
Line 44, after "is" delete "turnescent", and insert -- tumescent --.
Line 56, add -- Claim 9 The apparatus of claim 1, wherein the polymerdrill bit is flexible from the vertical axis between one-half inch and one inch. --.

Signed and Sealed this

Twenty-third Day of November, 2004

JON W. DUDAS
*Director of the United States Patent and Trademark Office*